E. W. JOHNSON.
AGRICULTURAL IMPLEMENT.
APPLICATION FILED MAR. 18, 1921.
1,412,615.
Patented Apr. 11, 1922.
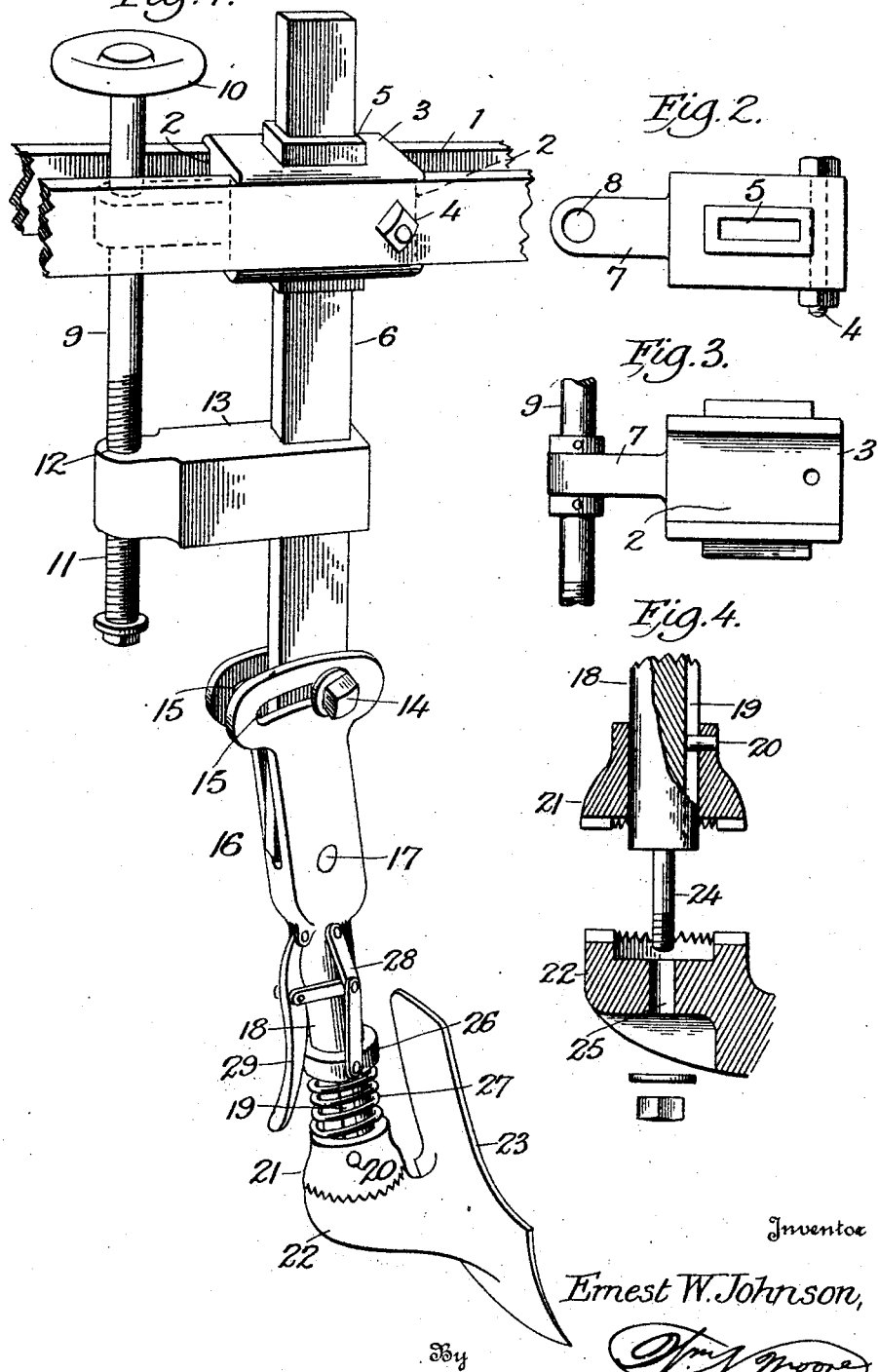
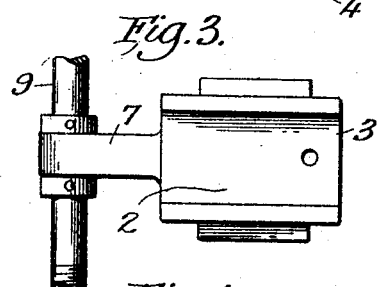
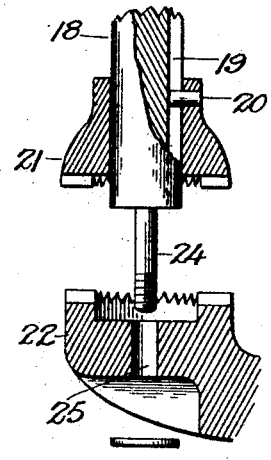
Inventor
Ernest W. Johnson,

UNITED STATES PATENT OFFICE.

ERNEST W. JOHNSON, OF CHRISTINE, NORTH DAKOTA.

AGRICULTURAL IMPLEMENT.

1,412,615.  Specification of Letters Patent.  Patented Apr. 11, 1922.

Application filed March 18, 1921. Serial No. 453,315.

*To all whom it may concern:*

Be it known that I, ERNEST W. JOHNSON, a resident of Christine, in the county of Richland, and State of North Dakota, a natural-born citizen of the United States, have invented certain new and useful Improvements in Agricultural Implements, of which the following is a specification.

My invention relates to improvements in agriculture implements, the improvements being particularly directed to the construction of cultivators and the shovel or teeth thereof, the main object being the provision of means for providing every necessary and desired adjustment of the tooth according to the work or service required.

Another object of my invention is the provision of improvements of the character stated which will be of simple, inexpensive and durable construction, which will allow of instant adjustment to the work required, and which generally in every particular will be thoroughly efficient and practical.

With these objects in view my invention consists of a cultivator tooth and connection embodying novel features of construction and combination of parts substantially as shown, described, and particularly defined by the claims, it being understood that changes may be made in the structure which come within the scope of the claims.

In order that the construction in detail and the operation of my invention may be understood and the advantages and features of merit may be appreciated I invite attention to the accompanying drawing, in which:—

Figure 1 is a perspective view of the complete cultivator tooth and connection constructed according to my invention.

Fig. 2 represents a top plan view of the block or head which is connected to the beams of the implement and forms what might be termed the mounting head.

Fig. 3 represents a side view of said mounting head, and

Fig. 4 represents a detail sectional view of the adjusting means for the shovel or tooth.

Referring by numeral to the drawings in which the same numerals are used to denote similar parts in all the views:

The numeral 1 designates the parallel beam of a cultivator between which by reason of the recesses 2, is mounted the block or head 3, which head is secured rigidly by the nut and bolt fastening 4, and is provided with a vertical opening 5, to receive the shank 6 which as will presently appear carries the cultivator shovel or tooth.

The block or head 3 is formed with the lug 7, provided with a guide opening 8 for the adjusting rod 9, which rod at its upper end is provided with a hand wheel or grasping portion 10, while its lower end 11 is threaded and engages the threaded opening 12, of the arm 13, said arm being rigidly attached to the shank 6, the adjustment of the rod 9 naturally adjusting said shank vertically with reference to the beams of the implement.

In the lower end of the shank is placed the clamping screw 14, which is disposed in the slots 15, of the bifurcated arm 16, thus permitting an adjustment of said arm upon its pivotal connection 17, with the shank, while said arm is formed with a stem 18, provided with a channel or groove 19, to receive the pin or stud 20 carried by the upper toothed collar 21, which engages the toothed collar or flange 22, of the shovel or tooth 23, the said toothed collars being held in proper adjusted relation by means of the threaded pin 24 depending from the stem 18 and being held in the opening 25 of the tooth or shovel by means of a nut or like clamping means, as will be readily understood.

Upon the said stem 18 is placed the collar 26, which acts upon the coil spring 27, providing a cushion, by means of the flexible connection 28, and the lever 29, which entire structure provides a cushion or spring connection of the tooth with the stem 18 for the purpose of permitting proper movement of the tooth and preventing breakage when contact with rocks or obstructions occurs.

From the description taken in connection with the drawings it will be apparent that I provide a construction for agriculture implements which in a unitary structure insures every adjustment required according to the service and that the adjustment can be quickly and easily made and that in all particulars the improvement is practical and efficient.

I claim:

1. In an agriculture implement, the combination with a mounting block having an opening and a lug, a shank mounted in said opening, means connecting the shank and lug of the block for adjusting said shank, a lever pivoted to the lower end of said shank and having a bifurcated portion formed with slots, a clamping screw for adjusting said bifurcated portion, a stem at the lower end of said lever, a toothed collar mounted on said stem, a shovel formed with a toothed collar to engage the toothed collar on the stem, a spring surrounding said stem and a collar around said stem and resting on said spring.

2. In an agriculture implement, the combination with the parallel beams, a mounting block having recesses receiving said beams and further provided with an opening and a projecting lug, a shank mounted in said opening, an arm carried by said shank and formed with a threaded opening, a threaded adjusting rod engaging said opening of the arm and guided in the lug of the block, a lever pivoted to the lower end of said shank and having a horizontally slotted upper portion, a clamping screw engaging said slotted portion to retain the lever in desired adjustments, a stem formed on the lower portion of said lever, a collar slidingly mounted on said stem, hand-operated flexible connections with said collar and stem, a shovel consisting of two members adjustable with reference to each other, means for securing said shovel in proper adjustment, and a spring disposed between said sliding collar and one of said members of the shovel.

In testimony whereof I hereunto affix my signature.

ERNEST W. JOHNSON.